(12) United States Patent
Aird

(10) Patent No.: US 10,605,077 B2
(45) Date of Patent: Mar. 31, 2020

(54) DRILL STEM MODULE FOR DOWNHOLE ANALYSIS

(71) Applicant: Alfred T Aird, New Braunfels, TX (US)

(72) Inventor: Alfred T Aird, New Braunfels, TX (US)

( * ) Notice: Subject to any disclaimer, the term of this patent is extended or adjusted under 35 U.S.C. 154(b) by 113 days.

(21) Appl. No.: 15/979,444

(22) Filed: May 14, 2018

(65) Prior Publication Data

US 2019/0345819 A1    Nov. 14, 2019

(51) Int. Cl.

| | |
|---|---|
| *E21B 10/60* | (2006.01) |
| *E21B 12/00* | (2006.01) |
| *E21B 17/00* | (2006.01) |
| *E21B 41/00* | (2006.01) |
| *E21B 49/00* | (2006.01) |
| *G01V 5/12* | (2006.01) |
| *G01V 11/00* | (2006.01) |
| *E21B 47/12* | (2012.01) |
| *G01V 3/34* | (2006.01) |
| *E21B 47/01* | (2012.01) |

(52) U.S. Cl.
CPC ............ *E21B 49/003* (2013.01); *G01V 5/125* (2013.01); *E21B 47/01* (2013.01); *E21B 47/122* (2013.01); *G01V 3/34* (2013.01); *G01V 11/002* (2013.01)

(58) Field of Classification Search
CPC .......... E21B 10/60; E21B 10/61; E21B 7/025; E21B 2010/607; E21B 41/078; E21B 12/00; E21B 44/00; E21B 44/005; E21B 17/006

See application file for complete search history.

(56) References Cited

U.S. PATENT DOCUMENTS

| | | | |
|---|---|---|---|
| 5,655,607 A | 8/1997 | Mellemstrand | |
| 5,679,894 A | 10/1997 | Kruger | |
| 6,863,136 B2 | 3/2005 | Bar-Cohen | |
| 6,918,440 B2 | 7/2005 | Garcia-Soule | |
| 7,216,533 B2 | 5/2007 | McGregor | |
| 7,343,983 B2 | 3/2008 | Livingstone | |
| 7,604,072 B2 | 10/2009 | Pastusek | |
| 7,775,099 B2 | 8/2010 | Bogath | |
| 8,196,677 B2 * | 6/2012 | Montgomery | ............ E21B 1/00 175/24 |
| 8,376,065 B2 | 2/2013 | Teodorescu | |
| 8,528,394 B2 | 9/2013 | Eriksen | |

(Continued)

*Primary Examiner* — Kenneth L Thompson
(74) *Attorney, Agent, or Firm* — R. Floyd Walker

(57) ABSTRACT

An apparatus is described that can be added to a drill stem and used during a drilling operation to measure downhole conditions in real-time. These measurements may include, but are not limited to, X-ray fluorescence, gamma density, depth, rotation speed, and image collection. In some embodiments, these measurements are stored within the apparatus for later retrieval. In other embodiments, the measurements are transmitted immediately to the surface. In some embodiments, the data is used immediately to control the operation of other devices both within and without the drill stem. The described apparatus may also include an air management system configured to clear debris from the measurement regions to improve the quality of the measurements obtained in those regions. This air management system may be configured to process air receive air from one end of the drill stem and transmit air out an opposite end of the drill stem.

20 Claims, 4 Drawing Sheets

(56) References Cited

U.S. PATENT DOCUMENTS

| | | |
|---|---|---|
| 8,695,728 B2 | 4/2014 | Trinh |
| 8,752,650 B2 | 6/2014 | Gray |
| 9,062,531 B2 | 6/2015 | Jones |
| 9,249,639 B2 * | 2/2016 | Rankin .................. E21B 10/18 |
| 9,404,359 B2 | 8/2016 | Fraser |
| 9,515,499 B2 | 12/2016 | Signorelli |
| 9,696,453 B2 | 7/2017 | Freedman |
| 9,739,141 B2 | 8/2017 | Zeng |
| 9,810,062 B2 | 11/2017 | Kkkurt |
| 9,927,550 B2 | 3/2018 | Mandal |
| 10,428,582 B1 * | 10/2019 | Anderson ............. E21B 47/187 |
| 10,494,868 B2 * | 12/2019 | Stacy, II ................ E21B 44/04 |
| 2014/0083769 A1 * | 3/2014 | Moriarty ................ E21B 44/00 |
| | | 175/40 |
| 2016/0097270 A1 * | 4/2016 | Pobedinski ............ E21B 44/00 |
| | | 700/275 |
| 2016/0245063 A1 * | 8/2016 | Lin ....................... E21B 44/005 |
| 2017/0227451 A1 | 8/2017 | Hoegerl |
| 2017/0321546 A1 | 11/2017 | Lawie |
| 2018/0066513 A1 * | 3/2018 | Sugiura .................... E21B 7/04 |
| 2019/0345779 A1 * | 11/2019 | Kennedy ................ E21B 47/01 |

* cited by examiner

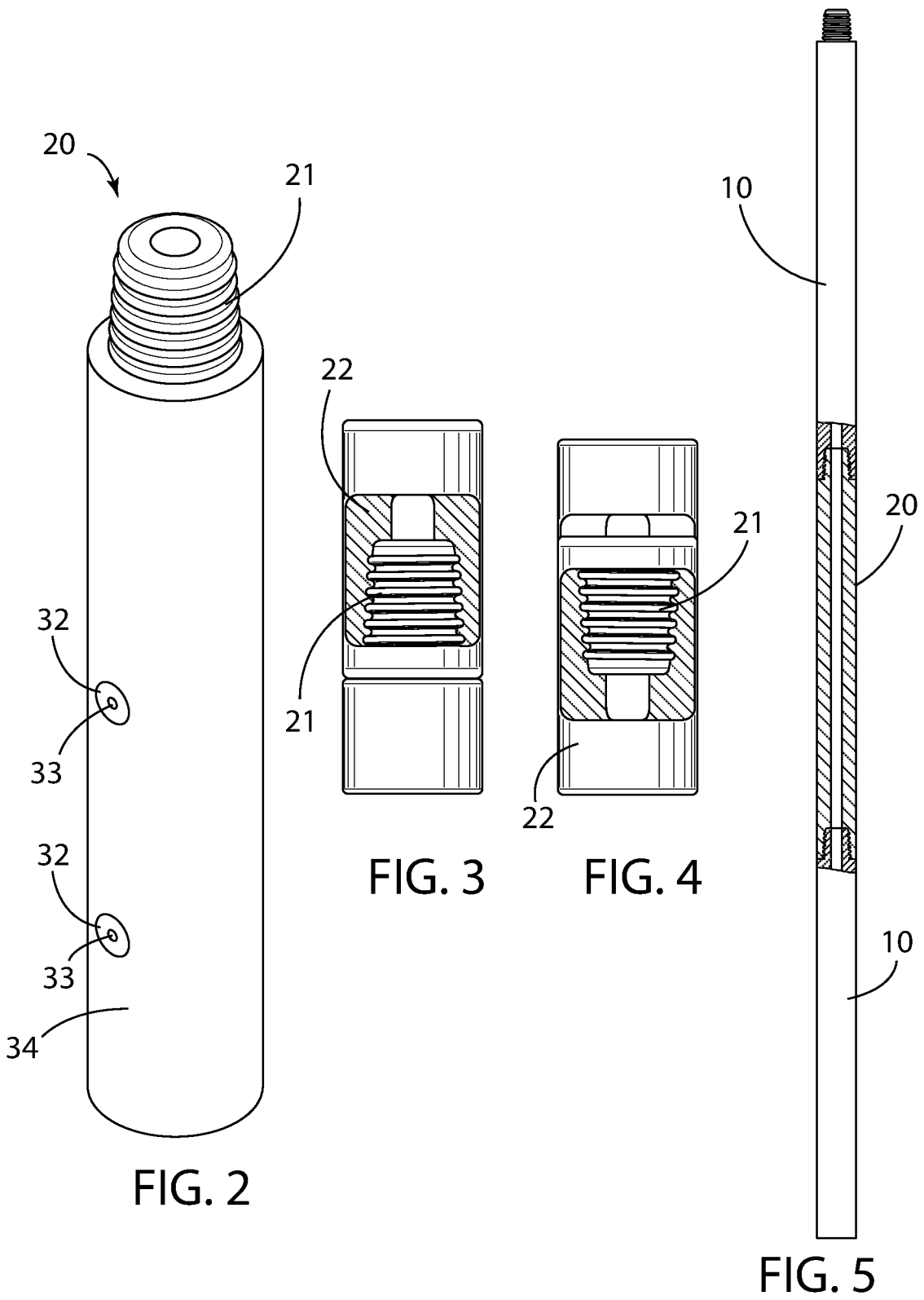

DRILL STEM MODULE FOR DOWNHOLE ANALYSIS

BACKGROUND OF THE INVENTION

The present invention generally relates to tools used for analysis during exploration drilling, and more specifically it relates to analysis tools that attach to drill stems for using during the process of drilling.

In drilling for minerals, hole diameters typically range from 3" to 7" and drill depths to a few hundreds of feet. The long steel drill stem transmits torque and downward force on the bit. The hammer is operated by compressed air supplied by the engine. Drilling involves the use of a hardened steel bit to penetrate a rock mass in order to extract samples for determining subsurface rock properties or to place explosives for breaking out rock mass.

A. Exploration Drilling

A property that is suspected to have economic deposit of useful minerals based on its geological setting determined by field work will have to be drilled to confirm those suspicion. Trenches may be dug to the investigate the subsurface, but the depth of trenches goes to about 30 feet, whereas the typical depth needed to traverse rich zones of valuable rock are a few hundred feet.

As the drill bit penetrates the rock, it cuts out cylinders of rock which are retrieved in the core barrel and stored by depth sequence in boxes. The boxes are logged by a geologist and transported to labs where the cores are prepared for analysis. The quality of the mineral deposit and an estimation of the amount of mineable mineral is determined from the exploration holes.

Due to the high cost of coring, exploration holes are spaced thousands of feet apart requiring extrapolation of data between the holes. Another problem is that core recovery may be low due to soft or broken rock in sections which leads to gaps in the data.

B. Mine Planning

When an area is being mined, it is necessary to know with confidence the quality of the minerals scheduled to be mined in the short term. The pertinent information for the land between exploration holes is uncertain since the holes are far apart. More holes are drilled with production drills rather than coring. Holes are drilled and the cuttings from the holes are collected in bags and labeled by depth intervals or by lithology predicted from the exploration holes. The bags are transported to labs for analysis. Since the rock samples are pulverized before they are brought up the borehole and collected, contamination may be an issue. Also, tests for physical rock properties from these samples can be challenging.

C. Rock Blasting

In many mining operations, the rock mass is too hard for direct mucking with a mechanical shovel or ripping up with a dozer. In such cases, blasting using explosives is done. Holes are drilled in a predetermined pattern near the rock face. Hole depth ranges from 10 feet to 100 feet with diameter ranging from 3 inches to 8 inches. The holes are loaded by a bulk truck with explosives according to the blast design and detonated. The rock falls to the floor in a muck pile which is then loaded to transport units for mineral processing.

Loading adjustments are made for the profile of the rock face to reduce fly rock and for effective breaking. In a layered rock face with varying rock properties, the explosive selection along the hole column may not be optimized leading to higher explosive ratios used to break the rock face. No automated loading exists based on rock properties or geology contact.

A method and apparatus for analyzing the subsurface conditions more accurately, quicker and less expensively is desirable.

SUMMARY OF THE INVENTION

An apparatus is described that can be added to a drill stem and used during a drilling operation to measure downhole conditions in real-time. These measurements may include, but are not limited to, X-ray fluorescence, gamma density, depth, rotation speed, and image collection. In some embodiments, these measurements are stored within the apparatus for later retrieval. In other embodiments, the measurements are transmitted immediately to the surface. In some embodiments, the data is used immediately to control the operation of other devices both within and without the drill stem. The described apparatus may also include an air management system configured to clear debris from the measurement regions to improve the quality of the measurements obtained in those regions. This air management system may be configured to process air receive air from one end of the drill stem and transmit air out an opposite end of the drill stem.

This broad description of some of the features of the invention is provide so that the detailed description may be better understood, and that the present contribution to the art may be better appreciated. There are additional features of the invention that will be described hereinafter. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

FIG. 2 illustrates the exterior of an exemplary downhole analysis tool.

FIGS. 3 illustrates a coupling between the top of an exemplary downhole analysis tool and the bottom of an exemplary drill rod.

FIG. 4 illustrates a coupling between the bottom of an exemplary downhole analysis tool and the top of an exemplary drill rod.

FIG. 5 illustrates a drill stem that includes an exemplary downhole analysis tool.

DETAILED DESCRIPTION

Figure 1:
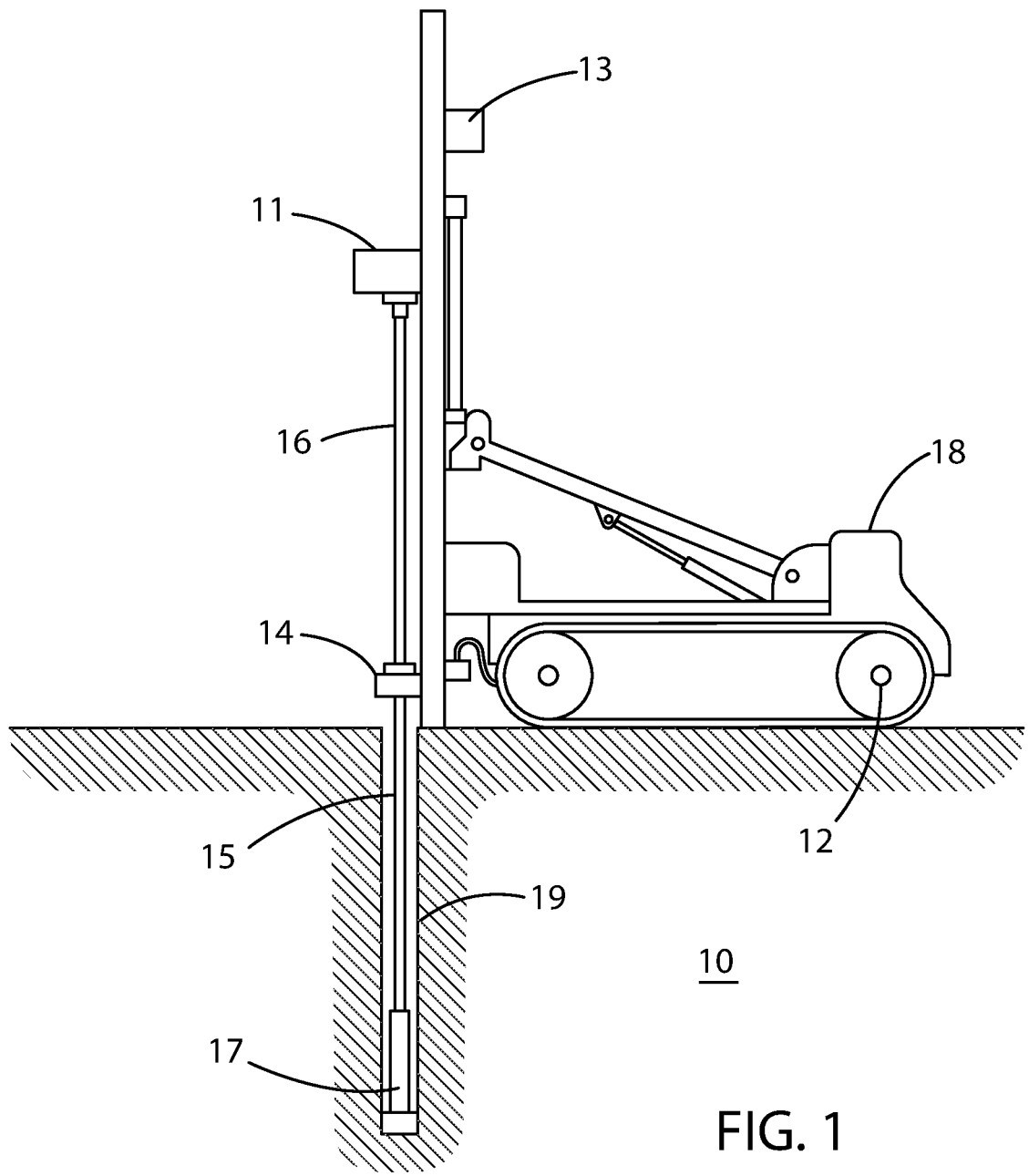
FIG. 1 illustrates the environment in which the disclosed downhole analysis tool can be used.

Turning now descriptively to the drawings, in which similar reference characters denote similar elements through the several views, FIGS. 1 through 10 illustrate a specialized drill rod configured to obtain downhole measurements during drilling. However, the disclosure can be used when drilling has been interrupted or after drilling has concluded.

A. Overview

FIG. 1 illustrates an exemplary environment for the use of the disclosed downhole analysis tool. FIG. 1 shows a drilling machine 10 configured to perform RC drilling in drill hole 19. The drilling machine 10 comprises a rotation motor 11, a propulsion motor 12, a feed motor 13, and a centralizer and clamp 14. The drilling machine 10 is configured to feed and operate drill stem 15 to drill further into drill hole 19. The drill stem 15 is generally comprised of a plurality of drill rods 16 connected together, as shown in FIG. 5. However, for sake of simplicity the drill stem 16 shown in FIG. 1 does not show drill rod boundaries. During drilling, drill stem 16 will include a hammer and drill bit 17 within the first drill rod 16 (i.e., the drill rod 16 at the bottom of drill hole 19). Using compressed air provided by the engine 18, the hammer will impact the drill bit causing the rock at the bottom of drill hole 19 to break apart to produce drill cutting. Using a combination of rotation of the drill stem 15 and compressed air that passes through the drill bit, drill cuttings will pass along side of the drill stem 15 and up the drill hole 19 and out on the surface. As this process continues, drill hole 19 becomes deeper. As the drill hole 19 becomes deeper, the drill stem 15 is fed deeper into drill hole 19 using feed motor 13. As the hole becomes deeper, additional drill rods 16 are appended to the drill stem 15 until the desired depth of drill hole 19 has been achieved. A centralizer and clamp 14 may be utilized to guide the flow of additional drill rods 16 in the drill stem 15 as well as permit passage of drill cuttings and air from within the drill hole 19.

FIG. 5 illustrates an exemplary drill stem 16 that includes a plurality of drill rods. Each drill rod 16 contains either a top pin 21 a bottom box 22 or both. Typically, the first drill rod 16 contains a hammer and drill bit 17 and only a top pin 21. All other drill rods typically include both a bottom box 22 for coupling with the drill rod 16 below it in the drill stem 15 and a top pin 21 for coupling with the drill rod 16 above it in the drill stem 15. Technically, the last drill rod 16 does not require a top pin 21, but it is not necessarily known in advance whether a given drill rod 16 will be the final drill rod 16 in the drill stem 15. FIGS. 3 and 4 illustrate a coupling between a top pin 21 and bottom box 22. As shown in these figures, top pin 21 and bottom box 22 are interchangeable in the sense that lower drill rods 16 could contain a bottom box 22 (technically a top box) that couples to a top pin 23 (technically, a bottom pin) in an upper drill rod 16. Typically, the disclose drill analysis tool 20 will serve as the second drill rod 16 in the drill stem 15 (i.e., immediately following the drill rod 16 containing the hammer and drill bit 17.) However, the drill analysis tool 20 can be placed at any location along the drill stem 15. In other embodiments, the drill analysis tool 20 can be integrated with the drill rod 16 containing the hammer and drill bit 17.

B. Downhole Analysis Tool

FIGS. 2 and 5 through 9 illustrate an exemplary downhole analysis tool 20. FIG. 2 illustrates the exterior of a downhole analysis tool 20 that generally includes, a top pin 21, a bottom box 22, an outer shell 34, and one or more air nozzles 32. The outer shell 34 is generally comprised of high strength lightweight materials such as steel, titanium, or various alloys. The air nozzles 32 are configured to direct air away from an opening 33 to enhance the operation one or more sensor modules (discussed below). In some embodiments, outer shell 34 has a smooth cylindrical shape as shown in FIG. 2. In other embodiments, outer shell 34 has the same shape as other intermediate drill rods, which may include one or more helical passages on the surface or other surface modifications. Generally, the placement of air nozzles 32 are chosen to avoid conflicting with any design constraints associated with the typical operation of a drill rod 16.

Figure 6:
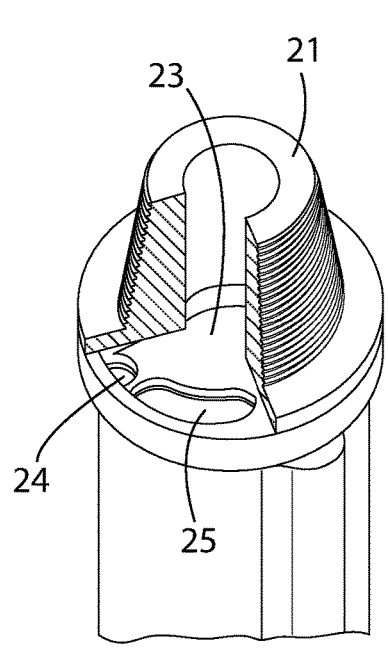
FIG. 6 illustrates the top of an exemplary downhole analysis tool.

FIG. 6 illustrates a detailed view of the top portion of an exemplary downhole analysis tool 20. In this embodiment, the top pin 21 includes a plurality of threads and posses a tapered shape. In addition, to the use of threads other coupling mechanisms can be used with the disclosed downhole analysis tool 20. The top portion of downhole analysis tool 20 may include a top plate 23 that comprises a separator inlet 24 and a bypass inlet 25. As will be explained in greater detail below, the separator inlet 24 feeds into an air separator 40. Bypass inlet 24 feeds into a bypass passage 31 that permits compressed air to pass directly from the top pin 21 to the bottom box 22 of the exemplary downhole analysis tool 20. Other embodiments may contain only a single inlet, and other embodiments may include additional inlets for the same or difference purposes. In addition, the configuration of inlets 24 and 25 are just examples. Other inlet configurations are also suitable for use the disclosed downhole analysis tool 20.

Figure 7:
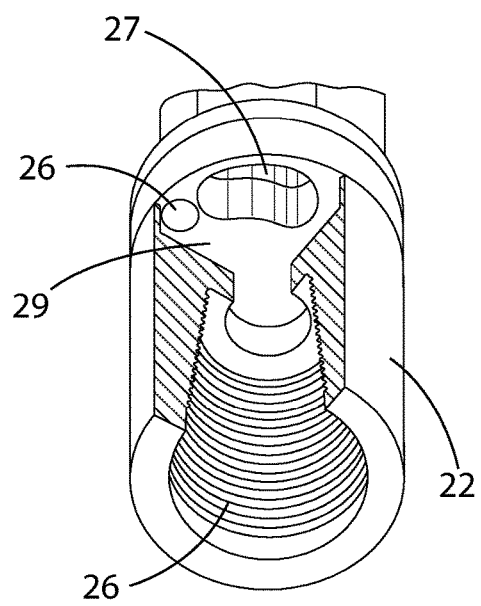
FIG. 7 illustrates the bottom of an exemplary downhole analysis tool.

FIG. 7 illustrates a detailed view of the bottom portion of an exemplary downhole analysis tool 20. In this embodiment, bottom box 22 comprises bottom threads 28 in a convex shape that is adapted to receive and couple with a corresponding top pin 21 such as the one shown in FIGS. 2 and 6. An exemplary coupling between a top pin 21 and a bottom box 22 is shown in FIG. 4. FIG. 6 also illustrates a bottom plate 26 that comprises a bypass outlet 27 and an internal outlet 29. The bypass outlet 27 is generally configured to receive air from a bypass passage 31. Internal outlet 29 is generally configured to receive air from an air pressure regulator 45, which is discussed in greater detail below.

Figures 8, 9:
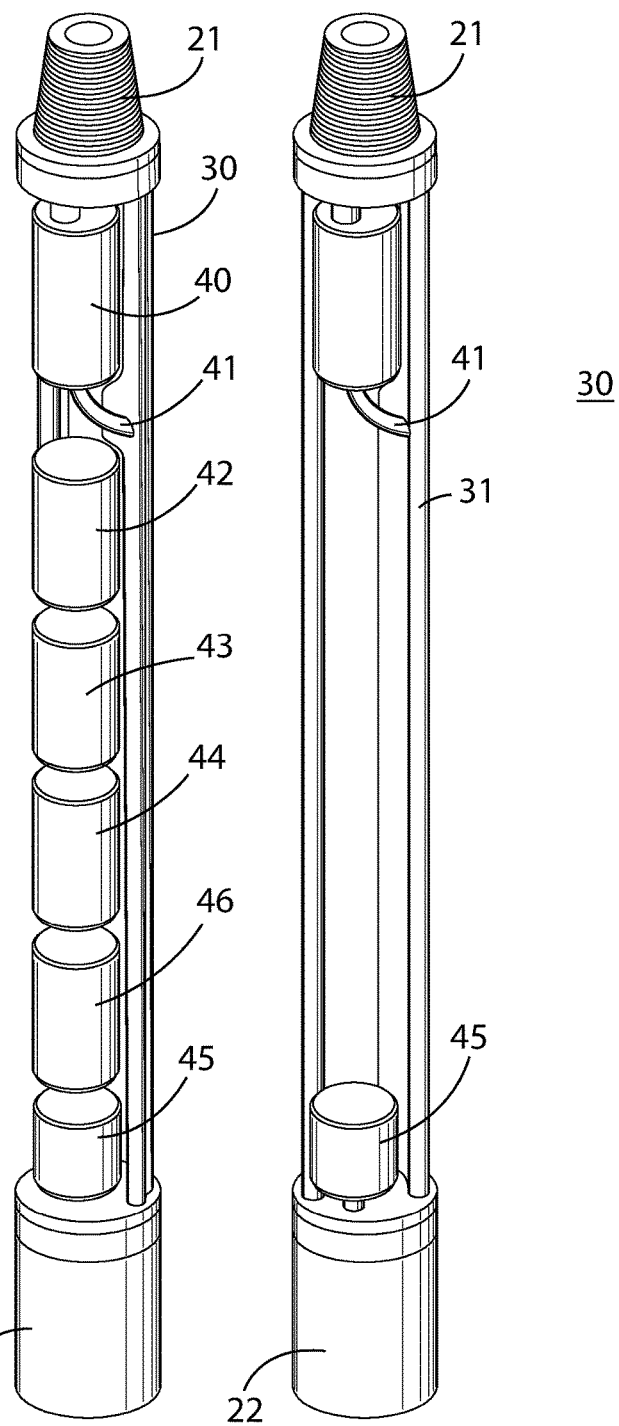
FIG. 8 illustrates the interior of an exemplary downhole analysis tool.
FIG. 9 illustrates the interior of an exemplary downhole analysis tool with emphasis on air flow management.

FIG. 8 illustrates the interior of an exemplary downhole analysis tool 20. In this embodiment, downhole analysis tool 20 comprises an air separator 40, a controller box 42, an X-ray fluorescence module 43, a camera module 44, an air pressure regulator 45, and a gamma module 46. This embodiment includes an internal air distributor 30, which is coupled to one or more air nozzles 32 and provides the compressed air for their operation. This embodiment also includes a bypass passage 31 that permits the flow of air directly through the downhole analysis tool 20. FIG. 7 also illustrates a fluid return 41 coupled between the air separator 40 and the bypass passage 31.

C. Air Management

FIG. 9 illustrates an exemplary downhole analysis tool 20 with special emphasis on air management. In this illustration, modules 42, 43, 44 and 46 have been removed for clarity. The compressed air used in RC drilling generally contains lubricants and other fluids which are useful in drilling. However, these additives may make the compressed air ordinarily used within a drill stem unsuitable for use in preparing the drill hole 19 for analysis by one or more sensor modules discussed below. To overcome this problem, this embodiment utilizes air management to create air suitable for internal usage.

In this embodiment, air from a higher drill rod 16 is received via top pin 21. As shown in FIG. 5, top plate 23 may split the flow of compressed air using a separator inlet 24 and a bypass inlet 25. In this embodiment, separator inlet 24 is smaller than bypass inlet 25. However, other configurations are possible. Generally, the size of separator inlet 24 is selected to accommodate at least the expected number of air nozzles 32 in the outer shell 34 of downhole analysis tool 20.

The air that flows through bypass inlet 25 into bypass passage 31 generally flows directly to bypass outlet 27 and to the next drill rod 16 in the drill stem 15. FIG. 8 illustrates a bypass passage 31 with a curved and slightly flattened shape, but other shapes are permissible including cylinders and rectangular prisms. In other embodiments, the path within the bypass passage 31 may spiral down the downhole analysis tool 20. In other embodiments, downhole analysis tool 20 may include a plurality of bypass passages 31. The air that passes through bypass passage 31 generally includes the same fluid composition as the air that originally entered the downhole analysis tool 20.

Air separator 40 is generally configured to receive air via separator inlet 24. In other embodiments, air separator 40 is configured to receive air from the bypass passage. Air separator 40 is configured to remove fluids from the inlet air. In this embodiment, the removed fluids are sent via fluid return 41 into bypass passage 31 for recombination with this bypass air. In this regard, the fluids are still available for lubrication and other functions. Air separator 40 may also include a vortex tube configured to produce a warm stream of air and a cool stream of air. For some embodiments, only the cool stream of air is desired. In those embodiments, the warm stream of air can be returned to the bypass passage 31 to rejoin the bypass air and removed fluids. In this embodiment, the separated air is coupled to an internal air distributor 30 that substantially spans the length of downhole analysis tool 20. In this embodiment, the internal air distributor 30 is configured to provide clean and cool air to one or more air nozzles 32. In this embodiment, the internal air distributor 30 terminates at an air pressure regulator 45. In this embodiment, the air pressure regulator 45 is configured to maintain the pressure within the internal air distributor below a certain threshold. In other words, the air pressure regulator 45 will open a relief valve whenever the pressure is too high. In other embodiments, the air pressure regulator 45 comprises a pump configured to maintain the pressure of the air outlet. In this regard, the air pressure regulator 45 is configured to make sure that the pressure passed to a lower drill rod 16 in the drill stem 15 is not too low. In some embodiments, air pressure regulator 45 is completely mechanical. In other embodiments, air pressure regulator 45 is controlled by controller box 42. In still other embodiments, no air pressure regulator 45 is necessary, and in still other embodiments, air my exit the downhole analysis tool 20 via an aperture 33 in the outer shell 34.

The air management system may include one or more pressure valves in the inlet or in the outlet. For example, if the downhole analysis tool 20 is not in operation, a valve over separator inlet 24 may be closed to direct all incoming air into the bypass passage 31 via bypass inlet 25. In some embodiments, a valve over separator inlet 24 may be configured to automatically close if the downhole analysis tool 20 loses power or fails in some manner.

The air from the air management system may also be used to cool the internal components of the downhole analysis tool 20 including, but not limited to, the controller box 42 and one or more sensor modules. In addition, the air management system can be configured to expel air from the downhole analysis tool 20 via an air nozzle 32 selected for the purpose.

D. Sensor Modules

The downhole analysis tool generally contains one or more sensor modules. As shown in FIG. 8, these sensor modules may include an X-ray fluorescence module 43, a camera module 44, and a gamma module 46. The X-ray fluorescence module 43 is configured to emit radiation to the drill hole 19 and measure the result of this emission. The X-ray fluorescence technique can be used to determine the composition of the material surrounding the drill hole at that location. The X-ray fluorescence module 43 may be coupled to an opening 33 in the outer shell 34 that permits it to take measurements without possible interference from the outer shell 34. The corresponding opening 33 may be coupled to an air nozzle 32 that is configured to remove debris from the area of the drill hole 19 that is being tested by the X-ray fluoresce module 43.

The downhole analysis tool 20 may also include a gamma module 46 that is configured to emit gamma radiation and measure the reflection of this gamma radiation. Among other things, this type of analysis can be used to detect the density of the surface of drill hole 19 in the area near the gamma module 46. The gamma module 46 may be coupled to an opening 33 in the outer shell 34 that permits it to take measurements without possible interference from the outer shell 34. The corresponding opening 33 may be coupled to an air nozzle 32 that is configured to remove debris from the area of the drill hole 19 that is being tested by the gamma module 46.

The downhole analysis tool 20 may also include a camera module 44 that is configured to take either still or moving pictures of a surface within the drill hole 19. As with the X-ray fluorescence module 43 and gamma module 46, the camera module 44 is generally coupled to an opening 33 that is coupled to an air nozzle 34. Although camera module 34 is generally configured to take pictures within the visible light spectrum, it can also be configured to measure other wavelengths including infrared and ultraviolet.

As shown in FIG. 8, the modules 43, 44, and 46 may be at different vertical locations within the downhole analysis tool 20. In some embodiments, they are placed at approximately the same vertical location at different regions along the outer surface. In other embodiments, the functionality of these modules is partially or completely coupled into a single module. As used herein, the term module does not necessarily refer to a discrete subsystem of the downhole analysis tool 20. As such, the functions of module 42, 43, and 46 may not be separated into clearly identifiable subcomponents.

Modules 43, 44, and 46 are merely examples of sensor modules that can be used with the downhole analysis tool 20. Downhole analysis tool 20 can also be used to conduct other types of measurements, including but not limited to external pressure, pressure within the air management system, external and internal temperature, depth, rotation speed, and vibration. Moreover, as explained below, some of these measurements may be incorporated into controller box 42.

E. Controller Box

The downhole analysis tool 20 may include a controller box 42 that houses electronic components that may be used with the downhole analysis tool 20. As shown in FIG. 9, the controller box 42 may contain a processor 50, a memory 51, an I/O interface 52, a communications module 53 that are coupled together by one or more data buses 54. Processor 50 is configured to read and execute instructions that may be stored in memory 51. These instructions may include storing data in memory 51, retrieving data from memory 51, communicating with devices external to the downhole analysis tool 20 via communications module 53, and communicating with devices internal to the downhole analysis tool 20 via I/O interface 52. Although communications module 53 and I/O interface 52 are shown as separate structures, their respective functionalities may be combined into one module, split into module modules, or combined with other modules including the disclosed sensor modules 43, 44 and 46.

Figure 10:
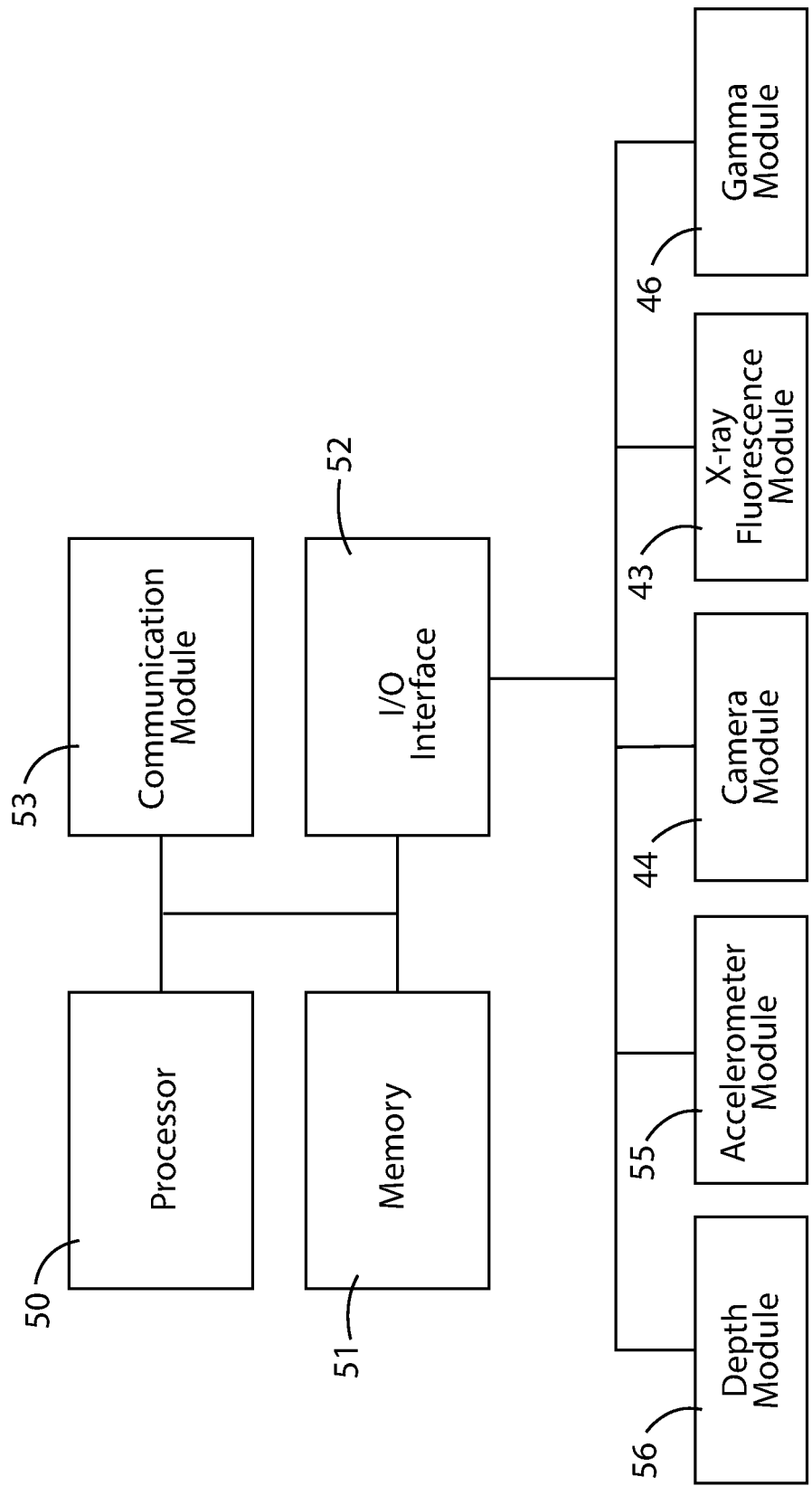
FIG. 10 is a block diagram illustrating an exemplary configuration of control electronics in a downhole analysis tool.

Processor 50 can be programmed to control the operation of one or more of the sensors modules 43, 44, and 46 via I/O interface 52. As shown in FIG. 10, I/O interface 52 is generally configured between the processor 50 and various other components such as sensor modules 43, 44, and 46, accelerometer module 55 and depth module 56. However, in some embodiments, processor 50 is configured to communicate with these structures directly. In this embodiment, the I/O interface 52 is coupled to processor 50 via a first data bus 54 and is coupled to other components via a second data bus 54. In other embodiments, there may be a single data bus 54 that couples together all subsystems. Memory 51 may include persistent storage (e.g. hard drive, optical storage, or solid-state drive) as well as volatile storage (i.e., RAM, processor cache, buffers), or a combination thereof. Furthermore memory 51 may include read-only components as well as write-once components (i.e., WORM).

In some embodiments, sensor modules 43, 44, and 46 are at least partially controlled by processor 50. Such control may take different forms depending on the configuration of the particular sensor module. For example, in some embodiments, the processor 50 issues a signal for the sensor module to conduct a reading, the sensor module then takes the reading and reports the results back to the processor 50, which the processor may store in memory 51. In other embodiments, the sensor module may store the results in memory 51 directly. However, in other configurations, processor 50 may control the low-level operations of each sensor module. For example, with X-ray fluorescence module 43, the processor 50 may control the operation of its emitter, including duration, intensity, frequency, as well as the operation of its detector. In this embodiment, the processor 50 may receive electrical signals that must be converted into the appropriate data, which may be require further analysis. For example, processor 50 may convert a received voltage to its corresponding data value. In some embodiments, processor 50 may control the low-level functions of some sensor modules, while allowing other sensor modules to perform their low-level functions in an autonomous fashion.

In one embodiment, processor 50 is coupled to an accelerometer module 55, which is configured to determine the rotational speed of downhole analysis tool 20. Using the measured rotational speed, the processor 50 can control camera module 44 in such a way as to take clear images despite the fact that downhole analysis tool 20 may be moving relative to the interior of drill hole 19 (i.e., rotating relative to the hole). In one embodiment, the processor 50 controls the camera module 44 such that it scans successive portions of a single image in sync with the rotation of the downhole analysis tool 20. For example, the camera module 44 may measure the lower portion of an image during a first rotation, the middle portion of the image during a second rotation, and the top portion of a single image during a third rotation. In other embodiments, processor 50 is coupled to a depth module 56 that enables the processor 50 to associate the reading for a particular sensor module with the depth at which its measurement has been taken. In other embodiments, information from accelerometer module 55 and depth module 56 can be used to align the measurement region for one or more of the sensor modules 43, 44, and 46. For example, in the embodiment shown in FIG. 8, the sensor modules 43, 44, and 46 are at different vertical locations within downhole analysis tool 20. By measuring the depth, the downhole analysis tool 20 can conduct an X-ray fluorescence analysis, gamma analysis, and visual analysis as the same vertical location and with the same rotational alignment. Thus, all reading for the sensor modules 43, 44, and 46 can be conducted at substantially the same location within drill hole 19 as the downhole analysis tool 20 is progressively lowered within the drill hole 19. In some embodiments, downhole analysis tool 20 is configured to conduct reading periodically based on depth (e.g., every foot), time since last reading (e.g., every 60 seconds) or some combination thereof.

Processor 50 is generally configured to store the data received from the various modules in memory 51. In addition to the data received from sensor modules 43, 44, and 46, this information may also include other readings as well as the time of the measurement. Processor 50 may be configured to format this information into a desired format (e.g., standard borehole log format), encrypt the data and/or compress the data. Processor 50 may also be coupled to a communications module 53, which is generally configured to transmit information to the surface. Processor 50 may transmit this information on a periodic basis to the surface. It may also be configured to transmit the data to the surface in a raw format that substantially conforms to the manner in which the data was received by the processor 50 from a given module. In other embodiments, processor 50 may be configured to delete from memory 51 a local copy of the data upon successful transmission. In other embodiments, it may be configured to store data indefinitely on a persistent memory storage device. This storage device may have only write-once functionality to prevent loss of data due to equipment or communication failures. Processor 50 may also be configured to receive instructions from the surface via communications module 53 that may alter or supplement its mode of operation. Communications module 53 may be configured to transmit wirelessly, using wires in the drill stem, or other communication methods alone or in combination. For example, communications module 53 may be configured to transmit wirelessly with wires as a backup or redundant connection. In addition, processor 50 may be configured to transmit instructions that direct or control the operation of drilling machine 10 or that direct or control the placement of explosives. Additionally, the controller box 42 may be configured to communicate with one or more mobile devices above or below the surface.

The controller box 42 generally includes a power source of some type. In some embodiments, the controller box 42 contains a power source that is used to power other components of the downhole analysis tool 20. In some embodiments, the controller box 42 contains a battery that is used to power itself and the other components have their own batteries or power sources. In some embodiments, the downhole analysis tool 20 comprises a generator configured to convert the rotational energy of the drill stem 15 into electrical power. In other embodiments, the generator is configured to convert the incoming air pressure from the drill stem 15 into electrical power.

The present invention may be utilized upon any telecommunications network capable of transmitting data including voice data and other types of electronic data. Examples of suitable telecommunications networks for the present invention include but are not limited to global computer networks (e.g. Internet), wireless networks, cellular networks, satellite communications networks, cable communication networks (via a cable modem), microwave communications networks, local area networks (LAN), and wide area networks (WAN). The present invention may communicate via a single telecommunications network or multiple telecommunications networks concurrently. Various protocols may be utilized by the electronic devices for communications such as but not limited to HTTP, SMTP, FTP and SSH. The present invention may also be utilized with online services and Internet service providers.

The mobile device or smartphone described herein may be comprised of any type of computer for practicing the various aspects of the present invention. For example, the mobile device can be a personal computer (e.g. APPLE® based computer, an IBM based computer, or compatible thereof) or a tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, and two-way radios. The present invention can also be used with any conventional computer. A conventional computer preferably includes a display screen (or monitor), a printer, a hard disk drive, a network interface, and a keyboard.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A drill rod adapted for attaching to a drill stem, comprising
   a substantially cylindrical main body having a first end, a second end opposite the first end, and an outer shell;
   a top pin attached to a first end of the main body adapted for attaching to the bottom box of a drill rod;
   a bottom box attached to the second end of the main body adapted for attaching to the top pin of a drill rod;
   an air management system within the main body configured to:
      receive an input flow of forced air via the first end of the main body;
      process at least a portion of the input flow of forced air to produce processed air;
      distribute processed air within the main body; and
      transmit an output flow of forced air via the second end of the main body;
   a sensor module configured to collect sensor data related to one or more conditions outside of the drill rod when the drill rod is rotating;
   an electronics module comprising:
      a memory;
      a processor configured to:
         control the collection of sensor data by the sensor module;
         receive sensor data from the sensor module; and
         store data related to the sensor data in the memory;
   at least one aperture in the outer shell of the main body; and
   at least one nozzle on the outer shell of the main body configured to receive processed air from the air management system and blow the processed air to remove obstructions from the proximity of the exterior portion of the aperture.

2. The drill rod of claim 1, wherein the air management system is configured to process at least a portion of the input flow of forced air by separating out particulate matter and by removing heat from at least a portion of the input flow of forced air.

3. The drill rod of claim 1, further comprising
   an accelerometer configured to obtain the rotational speed of the drill rod; and
   wherein the sensor module comprises a camera module configured to obtain images via an aperture; and
   wherein the processor is further configured to:
      cause the camera module to obtain an image using a shutter speed based at least in part on the rotational speed of the drill rod obtained from the accelerometer.

4. The drill rod of claim 1, wherein the sensor module comprises an X-ray fluorescence (XRF) module coupled to an aperture; wherein the X-ray florescence module comprises:
   an X-ray emitter; and
   an X-ray detector.

5. The drill rod of claim 1, wherein the sensor module comprises a gamma ray module, wherein the gamma ray module comprises:
   a gamma ray source; and
   a gamma ray detector.

6. The drill rod of claim 5, wherein the gamma ray source is a cesium-based gamma ray source.

7. The drill rod of claim 1, further comprising a communications module configured to transmit data from the drill rod to one or more remote receivers.

8. The drill rod of claim 7, wherein the communications module is configured to transmit data wirelessly.

9. The drill rod of claim 1, wherein the input flow of forced air comprises entrained lubricant; wherein the separated air is obtained using an air separator configured to remove and collect entrained lubricant from at least a portion of the input flow of forced air; wherein the cooled air is obtained using a vortex tube configured to produce cool air and warm air from at least a portion of the separated air.

10. The drill rod of claim 9, wherein the output flow of forced air comprises at least a portion of the input flow of forced air that has bypassed both the air separator and the vortex tube.

11. The drill rod of claim 10, wherein the output flow of forced air further comprises the warm air and the collected entrained lubricant.

12. The drill rod of claim 1, further comprising:
   a depth sensor configured to determine the depth of the drill rod within a drill hole; and wherein the processor is further configured to store data related to the sensor data according to a schedule based on one or more predetermined depths.

13. The drill rod of claim 12, wherein the one or more predetermined depths comprise multiples of a fixed length.

14. A drilling apparatus capable of measuring the downhole conditions of a drill hole, comprising:
 a drill stem comprising a plurality of drill rods coupled together, wherein at least one drill rod comprises:
  a main body having a first end, a second end opposite the first end, and an outer shell;
  an air management system within the main body configured to:
   receive an input flow of forced air via the first end of the main body;
   process at least a portion of the input flow of forced air to produce processed air;
   distribute processed air within the main body; and
   transmit an output flow of forced air via the second end of the main body; and
  a sensor module configured to collect sensor data related to one or more conditions outside of the drill rod and within a drill hole;
 an electronics module comprising:
  a memory; and
  a processor configured to:
   obtain sensor data from the sensor module; and
   store data related to the sensor data in the memory;
 an air compressor configured to force air into the drill stem;
 a rotational motor coupled to the drill stem and configured to rotate the drill stem;
 a feed motor coupled to the drill stem and configured to push the drill stem into the drill hole; and
 a drill bit at an end of the drill stem configured to remove or break apart material within the drill hole.

15. The drilling apparatus of claim 14, wherein the electronics module further comprises a communication module configured to receive data from the processor and transmit data to a location remote from the electronics module.

16. The drilling apparatus of claim 14, further comprising:
 a depth module configured to measure the depth of at least a portion of the drill stem; and
 wherein the processor is configured to store an association between the sensor data and the depth measured by the depth module.

17. The drilling apparatus of claim 14, wherein the processor is further configured to control the operation of the sensor module.

18. The drilling apparatus of claim 17, further comprising:
 an accelerometer module configured to measure the rotational speed of at least a portion of the drill stem;
 wherein the processor is configured to control the operation of the sensor module based at least in part on the data obtained from the accelerometer module.

19. The drill apparatus of claim 14, wherein at least a portion of the electronics module is within the drill stem.

20. A method of measuring the conditions with a drill hole comprising the steps of:
 attaching a drill rod to a drill stem, wherein the drill rod comprises:
  a main body having a first end, a second end opposite the first end, and an outer shell;
  an air management system within the main body configured to:
   receive an input flow of forced air via the first end of the main body;
   process at least a portion of the input flow of forced air to produce processed air;
   distribute processed air within the main body;
   transmit an output flow of forced air via the second end of the main body; and
   transmit processed air external to the drill rod;
  a sensor module configured to collect sensor data related to one or more conditions outside of the drill rod;
  an electronics module comprising:
   a memory;
   a processor configured to:
    receive sensor data from the sensor module;
    store data related to the sensor data in the memory; and
    control the operation of the air management system;
 drilling a drill hole using the drill stem;
 pumping forced air into the drill stem;
 clearing debris from at least a portion of a region of the drill hole outside of the drill stem to create a cleared region;
 measuring data using the sensor module within at least a portion of the cleared region of the drill hole; and
 storing at least a portion of the measured data using the processor into the memory.

* * * * *